(12) United States Patent
Abe

(10) Patent No.: US 8,089,442 B2
(45) Date of Patent: Jan. 3, 2012

(54) IMAGE PROJECTION APPARATUS

(75) Inventor: Masayuki Abe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 839 days.

(21) Appl. No.: 11/738,750

(22) Filed: Apr. 23, 2007

(65) Prior Publication Data
US 2007/0252800 A1 Nov. 1, 2007

(30) Foreign Application Priority Data

Apr. 28, 2006 (JP) ................................ 2006-126572

(51) Int. Cl.
G09G 3/36 (2006.01)
G09G 5/10 (2006.01)
G09G 5/02 (2006.01)
G09G 5/00 (2006.01)

(52) U.S. Cl. .............. 345/88; 345/87; 345/95; 345/690; 345/210; 345/589; 349/5; 349/8

(58) Field of Classification Search ........................ None
See application file for complete search history.

(56) References Cited

U.S. PATENT DOCUMENTS

| | | | | |
|---|---|---|---|---|
| 6,593,934 | B1 * | 7/2003 | Liaw et al. | 345/590 |
| 7,445,345 | B2 * | 11/2008 | Itoh et al. | 353/102 |
| 2002/0126075 | A1 | 9/2002 | Willis | |
| 2003/0043168 | A1 | 3/2003 | Dalal | |
| 2003/0132904 | A1 * | 7/2003 | Goyins | 345/87 |
| 2003/0137624 | A1 * | 7/2003 | Kang et al. | 349/113 |
| 2004/0119924 | A1 * | 6/2004 | Takeda et al. | 349/129 |
| 2004/0150654 | A1 | 8/2004 | Willis | |
| 2005/0140916 | A1 * | 6/2005 | Kume et al. | 349/156 |
| 2005/0168662 | A1 * | 8/2005 | Nakagawa | 349/5 |
| 2007/0085972 | A1 * | 4/2007 | Tan et al. | 353/20 |

FOREIGN PATENT DOCUMENTS

| | | |
|---|---|---|
| EP | 1 225 558 A1 | 7/2002 |
| EP | 1 339 039 A1 | 8/2003 |
| JP | 10-161127 | 6/1998 |
| JP | 11-305193 A | 11/1999 |
| JP | 2004-163450 A | 6/2004 |

OTHER PUBLICATIONS

Extended European Search Report dated Feb. 16, 2009, issued in corresponding EP 07008699.6-2205/1850317.

(Continued)

*Primary Examiner* — Bipin Shalwala
*Assistant Examiner* — Daniel Bedell
(74) *Attorney, Agent, or Firm* — Rossi, Kimms & McDowell LLP

(57) ABSTRACT

An image projection apparatus is disclosed which projects an image having a good color by reducing the influence of a lateral electric field in a liquid crystal display element (LCD). The apparatus includes three LCDs, each including two opposite electrodes. As the voltage applied to a liquid crystal layer is increased, retardation provided for light in each color band is increased. A controller controls an electrode application voltage in the first LCD such that, in a white display state, a liquid crystal application voltage (LCAV) in the first LCD is lower than the LCAVs in the second and third LCDs, and such that, in a black display state, the LCAV in the first LCD is higher than the LCAVs in the second and third LCDs and has a value from 1% to 30% of the LCAV in the first LCD in the white display state.

8 Claims, 12 Drawing Sheets

OTHER PUBLICATIONS

Y. Ji, et al., "Fringe-field Effects in Reflective CMOS LCD Design Optimization", 19000101, Jan. 1, 1900, XP007008922, the whole document.

Office Action issued in corresponding European Patent Application No. 07008699.6 dated Feb. 5, 2010.

* cited by examiner

IMAGE PROJECTION APPARATUS

BACKGROUND OF THE INVENTION

The present invention relates to an image projection apparatus referred to as a liquid crystal projector or the like.

A liquid crystal display element for use in liquid crystal projectors is formed, for example, by sealing nematic liquid crystal having a positive dielectric anisotropy between a first transparent substrate having a transparent electrode provided thereon and a second transparent electrode having a transparent electrode forming a pixel, wiring, a switching element and the like provided thereon. Such a liquid crystal display element includes liquid crystal molecules such that the arrangement of their long axes is continuously twisted 90 degrees between the two glass substrates and thus is called a TN (Twisted Nematic) liquid crystal display element.

In the TN liquid crystal display element, a voltage is applied between the first transparent substrate and the second transparent substrate to change the director orientations of the liquid crystal molecules to vary retardation (phase difference) in the whole liquid crystal layer, thereby achieving optical modulation.

More specifically, the arrangement of the liquid crystal molecules is continuously twisted 90 degrees between the two glass substrates while the lowest voltage is applied to the liquid crystal layer, for example, while no voltage is applied (hereinafter referred to as a "no-voltage application state" for convenience). In this state, when polarized light having a polarization axis in a predetermined direction enters the liquid crystal display element, the light is provided with retardation and the polarization direction is rotated approximately 180 degrees. As the voltage applied to the liquid crystal is increased, the directors of the twisted liquid crystal molecules are oriented in the thickness direction of the liquid crystal layer to reduce the retardation provided for the polarized light having the polarization axis in the predetermined direction. Such a liquid crystal display element is called a normally white (mode) liquid crystal display element.

Besides the abovementioned TN liquid crystal display element, a so-called VAN (Vertical Arrangement Nematic) liquid crystal display element is currently used. The VAN liquid crystal display element is formed by sealing nematic liquid crystal having a positive dielectric anisotropy between a first substrate having a transparent electrode provided thereon and a circuit substrate having a second substrate arranged in the form of pixels as a two-dimensional optical switch, wiring, a switching element and the like provided thereon. The nematic liquid crystal molecules are arranged in homeotropic alignment such that the long axes thereof are approximately perpendicular to the two substrates.

In such a VAN liquid crystal display element, a voltage is applied to the first substrate and the second substrate in the form of pixels, that is, between the opposite electrodes, to change the director orientations of the liquid crystal molecules to vary retardation in the whole liquid crystal layer, thereby realizing optical modulation.

More specifically, in the no-voltage application state of the liquid crystal layer, the long axes of the liquid crystal molecules are approximately perpendicular to the two substrates in the homeotropic alignment. When polarized light having a polarization axis in a predetermined direction enters the liquid crystal element, the light is provided with little retardation. As the voltage applied to the liquid crystal is increased, the arrangement of the director orientations of the liquid crystal molecules is continuously twisted between the two substrates to increase the retardation provided for the polarized light having the polarization axis in the predetermined direction. Such a liquid crystal display element is called a normally black (mode) liquid crystal display element.

In recent years, with a higher degree of resolution and a reduced size of the liquid crystal display element, pixel electrodes each forming pixel areas are arranged with extremely small intervals therebetween, and it has been found that a lateral electric field produced between adjacent pixel electrodes adversely affects the alignment of the liquid crystal.

Especially, advanced liquid crystal projectors have pixels with a very small size of approximately 10 μm, so that the influence of the lateral electric field is not ignorable. Now, a specific example of the disadvantage due to the lateral electric field will be described with reference to FIG. 13 which shows an exemplary VAN reflective liquid crystal display element.

In FIG. 13, reference numeral 1 shows a glass substrate having a transparent electrode provided thereon, and reference numeral 2 shows reflective pixel electrodes. Of the reflective pixel electrodes 2, reference numeral 2a shows a reflective pixel electrode in a black display state to which no voltage is applied, and reference numeral 2b shows a reflective pixel electrode in a white display state to which a voltage is applied. Reference numeral 3 shows a liquid crystal layer, and 4 a liquid crystal molecule in which the major axis of the ellipse corresponds to the director orientation in the liquid crystal molecule. Reference numeral 5 shows the transparent electrode, 6 an alignment film evaporated on the transparent electrode 5, and 7 an alignment film evaporated on the reflective pixel electrodes 2. Reference numeral 8 shows distribution of reflectance when the liquid crystal display element is sandwiched between crossed-Nicol polarizing plates, not shown. Reference numeral 9 shows a lateral electric field produced in the liquid crystal layer 3.

The VAN reflective liquid crystal display element uses the ECB (Electrically Controlled Birefringence) effect to totally control the polarization state of light traveling through the liquid crystal layer 3.

As shown in FIG. 13, the lateral electric field 9 is produced near the boundary between the pixel 2a to which no voltage is applied and the pixel 2b to which a voltage is applied, which causes an area 10 in the pixel of the reflective pixel electrode 2b where the alignment of the liquid crystal molecules is bad. This makes it impossible to control the polarization with the ECB effect to reduce the reflectance in the area 10. In other words, the reflectance in the whole pixel of the reflective pixel electrode 2b is reduced.

Japanese Patent Laid-Open No. 10(1998)-161127 has disclosed a liquid crystal display element capable of reducing bad alignment of liquid crystal molecules due to such a lateral electric field (disclination).

In the reflective liquid crystal projector, a color separation/combination optical system is used to separate white light from a light source into light components in three wavelength bands of a red band, a green band, and a blue band, and the light components in the respective wavelength bands are directed to three liquid crystal display elements associated therewith. After modulation by the three liquid crystal display elements, the light components are combined by the color separation/combination optical system before projection. Now, description will be made of characteristics when the same voltage is applied to all of the reflective pixel electrodes 2 of the reflective liquid crystal display element in such a reflective liquid crystal projector (hereinafter referred to as "in an all pixel display state"). In other words, description will be made of the case where the same voltage is applied to the reflective pixel electrodes 2a and 2b in FIG. 13.

Typically, liquid crystal molecules have a wavelength dispersion characteristic of refractive index anisotropy Δn, and to provide the highest reflectance generally in crossed Nicols, a higher voltage needs to be applied to the liquid crystal as the wavelength is longer. FIG. 14 shows the dependence of the reflectance on the voltage for each wavelength band in a typical VAN reflective liquid crystal display element in that case. In FIG. 14, the horizontal axis represents the voltage applied to the liquid crystal layer 3, while the vertical axis represents the reflectance (efficiency of light use) when the liquid crystal layer 3 is sandwiched between the crossed-Nicol polarizing plates. The reflectance is the gamma characteristic in which the maximum value of the efficiency of light use is normalized to 100% in the red band, green band, and blue band.

As apparent from FIG. 14, the voltages applied to the liquid crystal to provide the highest reflectance in the respective wavelength bands need to have the highest value for the red band, followed by the green band and the blue band, in view of the wavelength dispersion characteristic of the liquid crystal molecules.

Next, FIG. 15 shows the dependence of the reflectance on the voltage in the reflective pixel electrode 2b for each wavelength band when no voltage is applied to the reflective pixel electrodes 2a and a voltage is applied to the reflective pixel electrode 2b in FIG. 13. The horizontal axis represents the voltage applied to the liquid crystal layer 3 through the reflective pixel electrode 2b, while the vertical axis represents the reflectance (efficiency of light use) of the reflective pixel electrode 2b when the liquid crystal layer 3 is sandwiched between the crossed-Nicol polarizing plates. The reflectance is the gamma characteristic in which the maximum value of the efficiency of light use is normalized to 100% in the red band, green band, and blue band shown in FIG. 14.

As apparent from FIG. 15, the gamma characteristic of the reflective pixel electrode 2b shows substantially the same curves in a halftone up to near 4.5 V of applied voltage regardless of the wavelength band.

Since the peak of the efficiency of light use varies in the respective wavelength bands, the efficiency of light use of the reflective pixel electrode 2b shown in FIG. 15 is determined by the comparison with the level of the voltage applied to the liquid crystal layer 3 for providing the highest efficiency of light use in each wavelength band in the all pixel display state shown in FIG. 14.

The comparison between FIGS. 14 and 15 shows that the rate in the light band when the voltage is applied to the liquid crystal to provide the highest efficiency of light use in the all pixel display state (FIG. 14) is different from the rate in the light band in display with the reflective pixel electrode 2b (FIG. 15) in each wavelength band. In the former case, the red band, the green band, and the blue band have the rates of 100%, 100%, and 100%, respectively. In the latter case, the red band, the green band, and the blue band have the rate of 56%, 50%, and 41%, respectively. The all pixel display state (FIG. 14) differs from the display state by the reflective pixel electrode 2b (FIG. 15) in the ratio of the respective wavelength bands in a combined projected image.

FIG. 16 shows the image of a character pattern in which one pixel and one pixel line display white, as a specific projected image. One rectangular in the image represents one pixel. In the image, reference numeral 100 shows pixels in a black display state to which no voltage is applied. Reference numeral 101 shows pixels in a white display state to which a voltage is applied for providing the highest efficiency of light use in the respective wavelength bands.

FIG. 17 shows an image in the all pixel white display state. In the image, reference numeral 101 shows pixels to which a voltage is applied for providing the highest efficiency of light use in the respective wavelength bands.

The comparison between the colors of the projected images in FIGS. 16 and 17 shows that the ratios of light bands in FIG. 17 have a color balance of the red band 1:the green band 1:the blue band 1, and the ratios of light bands in FIG. 16 have a color balance of the red band 5.6:the green band 5.0:the blue band 4.1. Thus, as compared with the color balance in the all pixel white display state in FIG. 17, the color balance in the white character display state shown in FIG. 16 has the particularly low ratio of the blue band, with the result that the character has a color with a shift toward yellow.

FIG. 18 shows the image of a checkered pattern in which pixels in the black display state and pixels in the white display state are alternately arranged. This image has a color balance similar to that of the image in FIG. 16 and has a color with a shift toward yellow as compared with the image in FIG. 17.

As described above, when a character of one pixel and one line or a checkered pattern is output as a projected image, the image has a color different from the color in the all pixel white display state due to the influence of a lateral electric field in the liquid crystal display element. This degrades the quality of the projected image.

In the liquid crystal display element disclosed in Japanese Patent Laid-Open No. 10(1998)-161127, the pretilt angle provided by an alignment film on a first substrate is set to be smaller than the pretilt angle provided by an alignment film on a second substrate to reduce the bad alignment of the liquid crystal molecules due to disclination.

The technique disclosed in Japanese Patent Laid-Open No. 10(1998)-161127, however, relates to the structure of the liquid crystal display element and does not remove the influence of the lateral electric field sufficiently. No disclose has been made on a countermeasure against a change in color balance when a pattern involving the occurrence of a lateral electric field is displayed by a liquid crystal display element in a projector which performs color separation and combination to project an image. Even when the technique disclosed in Japanese Patent Laid-Open No. 10(1998)-161127 is used, the quality of the color of an image resulting from color combination is reduced.

BRIEF SUMMARY OF THE INVENTION

The present invention provides an image projection apparatus which can project an image having a good color (color balance) by reducing the influence of the lateral electric field in the liquid crystal display element.

According to an aspect, the present invention provides an image projection apparatus combines light from a first liquid crystal display element which light in a first color band enters, light from a second liquid crystal display element which light in a second color band enters, and light from a third liquid crystal display element which light in a third color band enters, and projects the combined light onto a projection surface. Each liquid crystal display element includes a liquid crystal layer, and first and second opposite electrode for applying a voltage to the liquid crystal layer through alignment films. As the voltage applied to the liquid crystal layer is increased, retardation provided for the light in each color band is increased. When the voltage which is applied to the liquid crystal layer is referred to as a liquid crystal application voltage and the voltage which is applied to the first and second opposite electrodes is referred to as an electrode application voltage, the controller controls an electrode application voltage in the first liquid crystal display element such that a liquid crystal application voltage in the first liquid crystal display element in a white display state is lower than the liquid crystal application voltages in the second and third liquid crystal display elements in the white display state, and such that the liquid crystal application voltage in the first liquid crystal display element in a black display state is higher than the liquid crystal application voltages in the second and third liquid crystal display elements in the black display state and has a value of 1% or more and 30% or less of the liquid crystal application voltage in the first liquid crystal display element in the white display state.

According to another aspect, the present invention provides an image projection apparatus combines light from a first liquid crystal display element which light in a first color band enters, light from a second liquid crystal display element which light in a second color band enters, and light from a third liquid crystal display element which light in a third color band enters, and projects the combined light onto a projection surface. Each liquid crystal display element includes a liquid crystal layer, and first and second opposite electrodes for applying a voltage to the liquid crystal layer through alignment films. As the voltage applied to the liquid crystal layer is increased, retardation provided for the light in each color band is reduced. When the voltage which is applied to the liquid crystal layer is referred to as a liquid crystal application voltage and the voltage which is applied to the first and second opposite electrodes is referred to as an electrode application voltage, the controller controls an electrode application voltage in the first liquid crystal display element such that a liquid crystal application voltage in the first liquid crystal display element in a white display state is higher than the liquid crystal application voltages in the second and third liquid crystal display elements in the white display state, and such that the liquid crystal application voltage in the first liquid crystal display element in a black display state is higher than the liquid crystal application voltages in the second and third liquid crystal display elements in the black display state.

According to another aspect, the present invention provides an image display system including the abovementioned image projection apparatus and an image supply apparatus which supplies image information to the image projection apparatus.

Other objects and features of the present invention will be apparent from the following description of a preferred embodiment with reference to the accompanying drawings.

DETAILED DESCRIPTION OF THE PREFERRED EMBODIMENTS

Preferred embodiments of the present invention will hereinafter be described with reference to the drawings.

Embodiment 1

Figure 1:
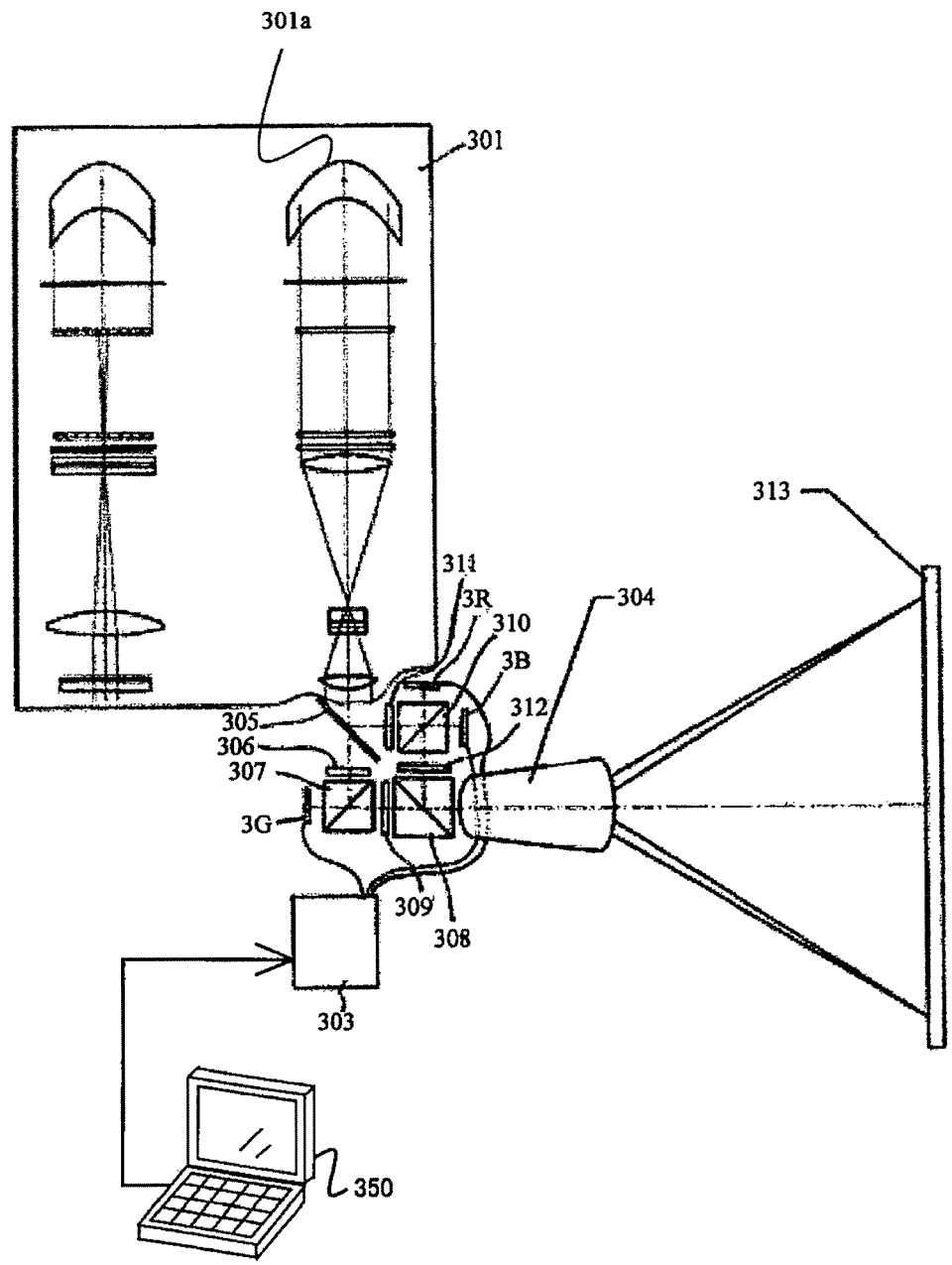
FIG. 1 is a section view showing the structure of a reflective liquid crystal projector in Embodiments 1 to 3 of the present invention.

FIG. 1 shows the structure of a reflective liquid crystal projector (image projection apparatus) which is Embodiment 1 of the present invention.

In FIG. 1, reference numeral 303 shows a liquid crystal driver serving as a controller. The liquid crystal driver 303 receives a video signal (image information) from an image supply apparatus 350 such as a personal computer, a DVD player, and a television tuner. The liquid crystal driver 303 converts the video signal into driving signals for a red (R) liquid crystal display element 3R, a green (G) liquid crystal display element 3G, and a blue (B) liquid crystal display element 3B, all of which are reflective liquid crystal display elements. Thus, the red liquid crystal display element 3R, the green liquid crystal display element 3G, and the blue liquid crystal display element 3B are individually controlled. The projector and the image supply apparatus 350 constitute an image display system.

Figure 4:
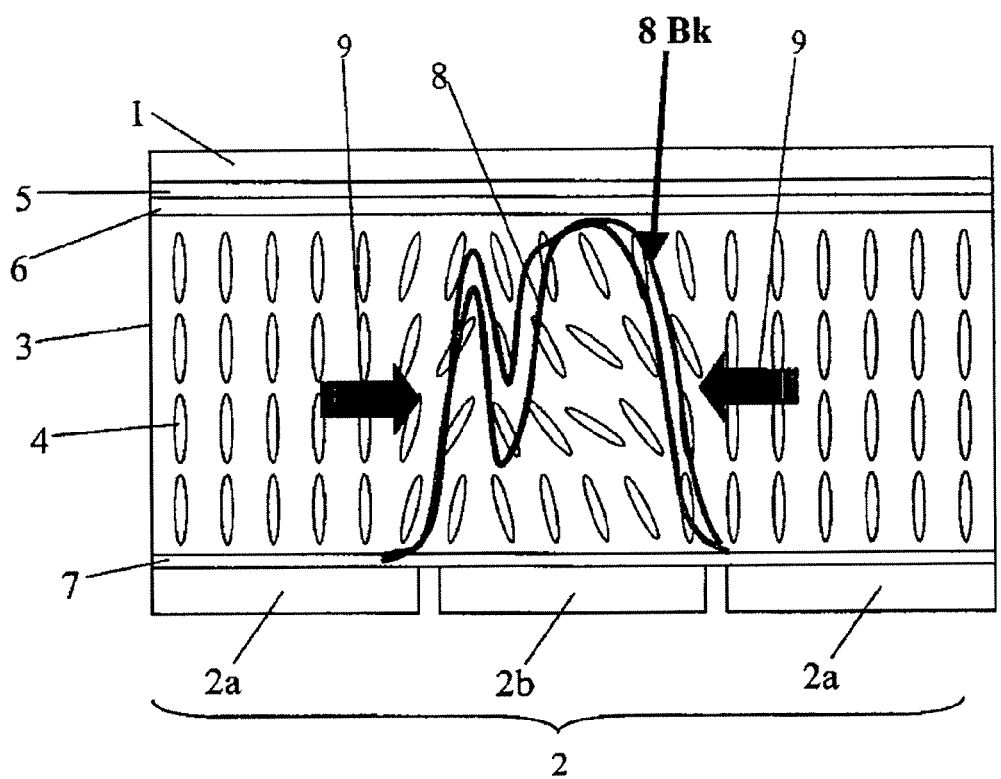
FIG. 4 shows the structure of the liquid crystal display element and the reflectance distribution in a black display pixel when a checkered pattern is displayed in Embodiments 1 to 3.
Figure 13:
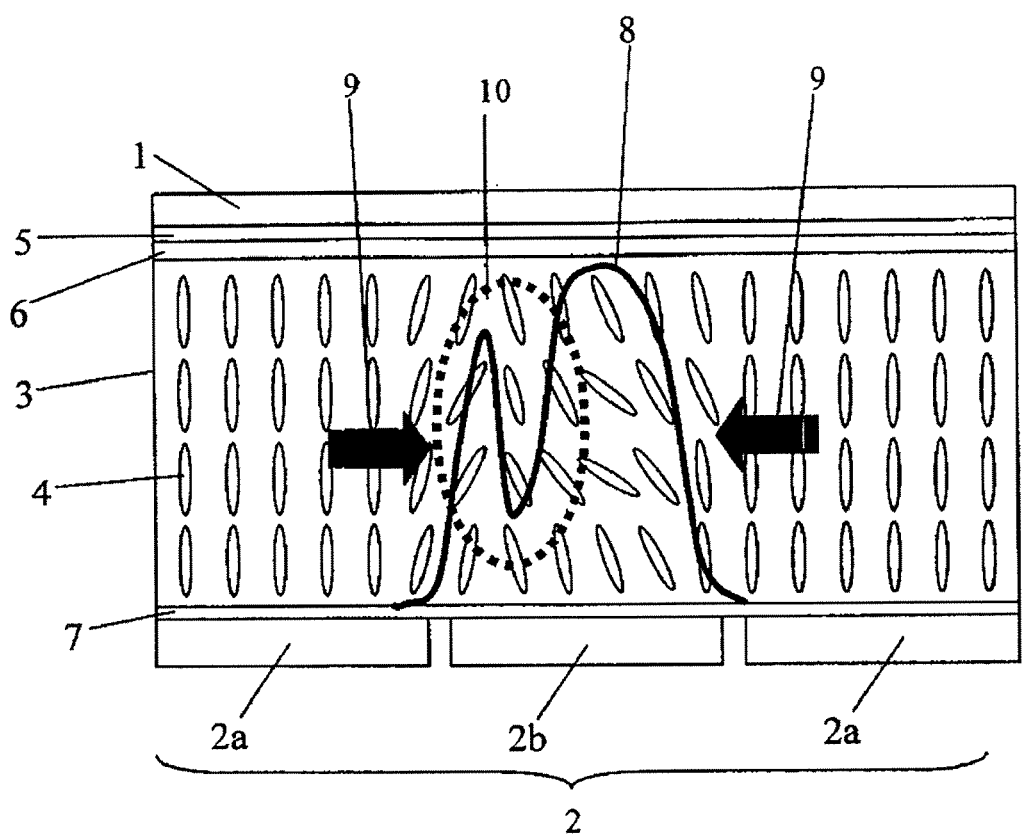
FIG. 13 shows the structure of a liquid crystal display element and the reflectance distribution in a black display pixel when a checkered pattern is displayed in the related art.

The structure of each liquid crystal display element shown in FIG. 4 is identical to that shown in FIG. 13. Reference numeral 1 shows a glass substrate, and reference numeral 2 (2a, 2b) shows a reflective pixel electrode. Reference numeral 3 shows a liquid crystal layer, 4 a liquid crystal molecule in which the long axis of the ellipse corresponds to the director orientation of the liquid crystal molecule, and 5 a transparent electrode constituting opposite electrodes together with the reflective pixel electrode 2. Reference numeral 6 shows an alignment film evaporated on the transparent electrode 5, and reference numeral 7 shows an alignment film evaporated on the reflective pixel electrode 2.

The liquid crystal driver 303 controls a voltage (hereinafter referred to as an electrode application voltage) which is applied between the opposite electrodes 2 and 5 such that a voltage (hereinafter referred to as a liquid crystal application voltage) applied to the thickness direction of the liquid crystal layer 3 in each liquid crystal display element has a voltage value as described later.

Reference numeral 301 shows an illumination optical system. Shown on the left in a box in FIG. 1 is the side view of the illumination optical system 301 shown on the right. The illumination optical system 301 converts white light emitted from a light source lamp 301a such as a high pressure mercury lamp into linearly polarized light having a polarization direction perpendicular to the sheet of FIG. 1 and directs the polarized light toward a dichroic mirror 305.

The dichroic mirror 305 in Embodiment 1 reflects light in magenta and transmits light in green. The magenta light component in the white light is deflected and directed toward a blue cross color polarizer 311.

The blue cross color polarizer 311 provides retardation of one-half wavelength for polarized light in blue. This produces a blue light component which is linearly polarized light having a polarization direction in parallel with the sheet of FIG. 1 and a red light component which is linearly polarized light having a polarization direction perpendicular to the sheet of FIG. 1.

Next, the blue light component enters a first polarization beam splitter 310 as P-polarized light and is transmitted through a polarization beam splitting film toward the liquid crystal display element 3B for blue. The red light component enters the first polarization beam splitter 310 as S-polarized light and is reflected by the polarization beam splitting film toward the liquid crystal display element 3R for red.

On the other hand, after the transmission through the dichroic mirror 305, the green light component passes through a dummy glass 306 for correcting the length of an optical path and then enters a second polarization beam splitter 307. The green light component having the polarization direction perpendicular to the sheet of FIG. 1 is S-polarized light for a polarization beam splitting film of the second polarization beam splitter 307, so that the green light component is reflected thereby and is directed toward the liquid crystal display element 3G for green.

As described above, the illumination light components enter the red liquid crystal display element 3R, the green liquid crystal display element 3G, and the blue liquid crystal display element 3B.

Each of the liquid crystal display elements provides retardation for the entering illumination light (polarized light) in accordance with the modulation state of pixels arranged on the liquid crystal display element. Of reflected light from each liquid crystal display element, the light component polarized in the same direction as that of the illumination light is generally returned along the optical path of the illumination light toward the light source lamp.

Of the reflected light from each liquid crystal display element, image light formed of the light component polarized in the direction perpendicular to the polarization direction of the illumination light travels in the following manner.

The red light component which is linearly polarized light having the polarization direction in parallel with the sheet of FIG. 1 emerges from the red liquid crystal display element 3R and is transmitted through the polarization beam splitting film of the first polarization beam splitter 310 as P-polarized light and then transmitted through a red cross color polarizer 312.

The red cross color polarizer 312 provides retardation of one-half wavelength for the red light component. This converts the red light component into linearly polarized light having the polarization direction perpendicular to the sheet of FIG. 1. The red light component enters a third polarization beam splitter 308 as S-polarized light and is reflected by its polarization beam splitting film toward a projection optical system 304.

The blue light component which is linearly polarized light having the polarization direction perpendicular to the sheet of FIG. 1 emerges from the blue liquid crystal display element 3B and is reflected by the polarization beam splitting film of the first polarization beam splitter 310 as S-polarized light and then transmitted through the red cross color polarizer 312 without any change. The blue light component enters the third polarization beam splitter 308 as S-polarized light and is reflected by the polarization beam splitting film toward the projection optical system 304.

The green light component which is linearly polarized light having the polarization direction in parallel with the sheet of FIG. 1 emerges from the green liquid crystal display element 3G and is transmitted through the polarization beam splitting film of the second polarization beam splitter 307 and then transmitted through a dummy glass 309 for correcting the length of the optical path. The blue light component enters the third polarization beam splitter 308 as P-polarized light, is transmitted through the polarization beam splitting film, and is directed toward the projection optical system 304.

After the color combination in the third polarization beam splitter 308, the red, green, and blue light components are taken by the entrance pupil of the projection optical system 304 and are transferred to a light diffusion screen (projection surface) 313. Since the light modulation surfaces of the respective liquid crystal display elements and the optical diffusion surface of the screen 313 are placed in an optically conjugate relationship with the projection optical system 304, an image based on the video signal is projected (displayed) on the screen 313. The red liquid crystal display element 3R, the green liquid crystal display element 3G, and the blue liquid crystal display element 3B are adjusted such that the light components from the associated pixels overlap on the screen 313 with predetermined accuracy.

Each of the liquid crystal display elements of Embodiment 1 is realized by the VAN reflective liquid crystal display element having the structure shown in FIG. 4. Each of the liquid crystal display elements is a normally black liquid crystal display element which projects a white display image resulting from increased retardation when a voltage applied to the liquid crystal layer is increased.

The "normally black" in use in the projector means the following characteristic. Specifically, in the relationship between the liquid crystal display elements and the polarization beam splitters and the polarizing plates for analyzing the image light emerging from the liquid crystal display elements, it refers to the characteristic that an increased voltage applied to the liquid crystal display element leads to a higher luminance of the image light analyzed by the polarization beam splitters or the like.

In other words, it means the characteristic that black display (the darkest display) is performed when a voltage applied to the liquid crystal display element is equal to or close to zero, and white display is performed, that is, the luminance of the image light analyzed by the polarization beam splitters and the like is increased when a higher voltage is applied to the liquid crystal display element.

Figure 14:
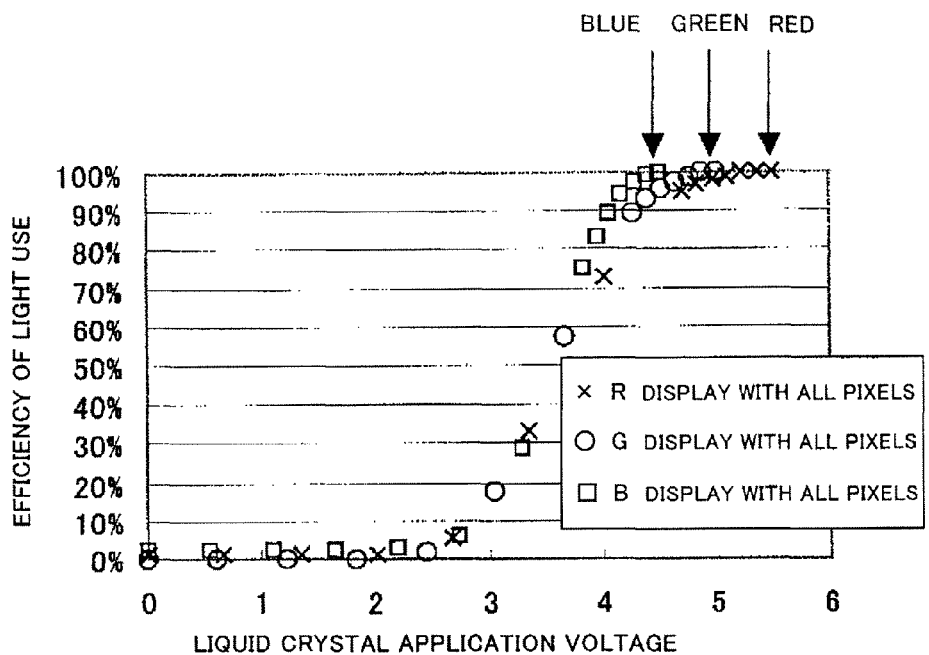
FIG. 14 is a graph showing the dependence of efficiency of light use on voltage for each wavelength in the liquid crystal display element.

FIG. 14 shows the dependence of the reflectance (that is, the output of the light reflected by each liquid crystal display element and projected onto the screen 313, hereinafter referred to as projected reflection output) of the red liquid crystal display element 3R, the green liquid crystal display element 3G, and the blue liquid crystal display element 3B on the voltage applied to the liquid crystal. FIG. 14 shows the gamma characteristic in which the maximum value of the reflectance is normalized to 100% in the red liquid crystal display element 3R, the green liquid crystal display element 3G, and the blue liquid crystal display element 3B.

As apparent from FIG. 14, the liquid crystal application voltages to provide the highest reflectance in the respective liquid crystal display elements need to have the highest value for the red liquid crystal display element 3R, followed by the green liquid crystal display element 3G and the blue liquid crystal display element 3B, in view of the wavelength dispersion characteristic of the liquid crystal molecules.

Figure 2:
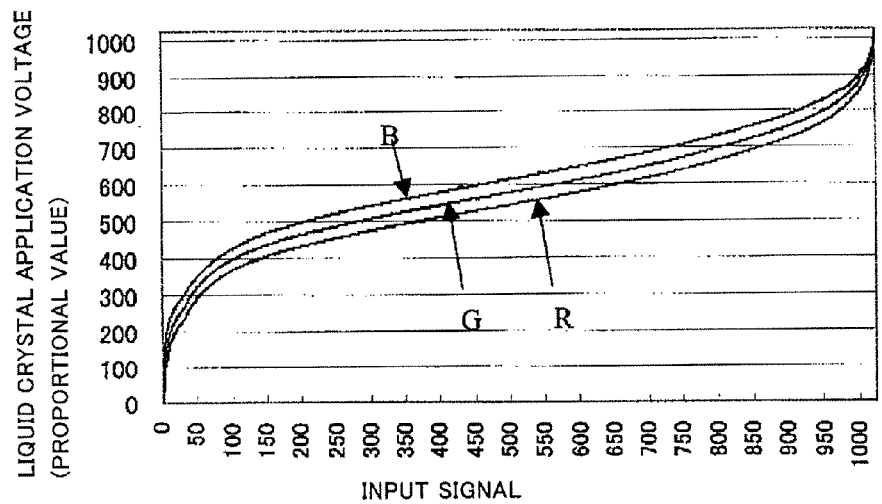
FIG. 2 is a graph showing a VT gamma characteristic of a liquid crystal display element used in the projector of Embodiment 1.

FIG. 2 shows the VT gamma characteristic determined such that the projected reflection output shows a curve of 2.2th power of the input video signal. The liquid crystal driver 303 determines driving signals (electrode application voltages) for the respective liquid crystal display elements so as to provide the liquid crystal application voltages in accordance with the gamma characteristic.

Figure 3:
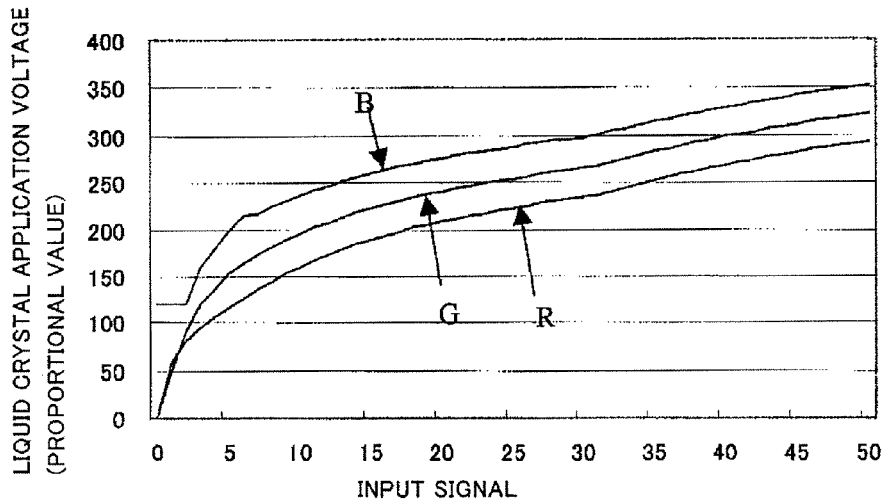
FIG. 3 is an exploded view of an area near black display in FIG. 2.

In FIG. 2, the horizontal axis represents the input signal (digital 10 bits) and the vertical axis represents the proportional value (digital 10 bits) corresponding to the liquid crystal application voltage in the liquid crystal display elements. The proportional value is provided by normalizing the liquid crystal application voltage with the highest reflectance in each liquid crystal display element (hereinafter referred to as the highest reflectance voltage) with 1023 which is the maximum of 10 bits. In the horizontal axis, digital value zero is a set value for the liquid crystal display elements 3R, 3G, and 3B in a black display state, and the maximum digital value 1023 is a set value for the liquid crystal display elements 3R, 3G, and 3B in a white display state. FIG. 3 is an exploded view showing the area near the digital value zero in FIG. 2.

In Embodiment 1, the liquid crystal application voltage is set to 0 V in the red and green liquid crystal display elements 3R and 3B in the black display state, while the liquid crystal application voltage is set to 0.53 V in the blue liquid crystal display element 3B in the black display state.

The vertical axis of the VT gamma characteristic in FIGS. 2 and 3 represents the value in proportion to the liquid crystal application voltage. When the highest reflectance voltage in the blue liquid crystal display element 3B is 4.5 V (FIG. 14), the liquid crystal application voltage of the blue liquid crystal display element 3B in the black display state can be calculated as follows. Specifically, with reference to FIGS. 2 and 3, the digital value in the black display state on the vertical axis is 120. The ratio of that digital value to 1023 is 0.117 (=120/1023). Thus, the liquid crystal application voltage in the black display state is 0.53 V from the calculation of 0.117×4.5 V.

Figure 18:
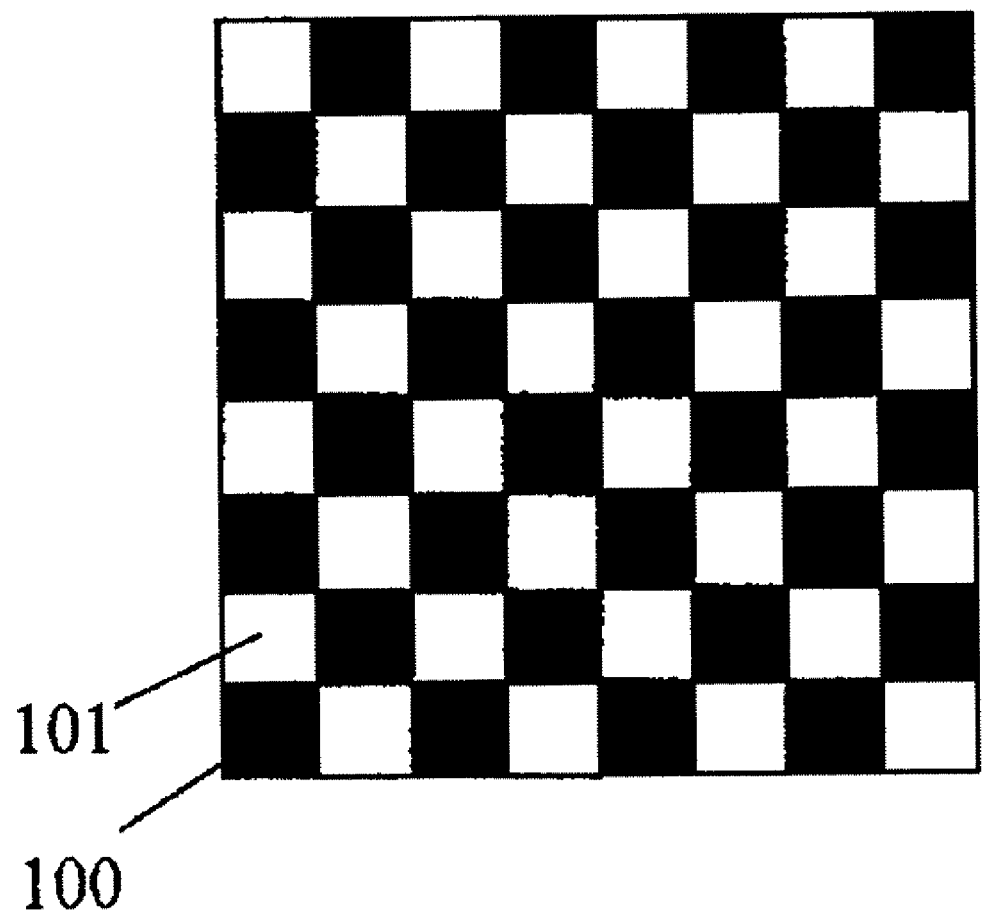
FIG. 18 shows a checkered pattern susceptible to the lateral electric field in the liquid crystal display element.

Now, description will be made of the color of the image of the checkered pattern shown in FIG. 18 when it is displayed in Embodiment 1.

In the projector shown in FIG. 1, when all of the pixels of the liquid crystal display elements 3R, 3G, and 3B are in the white display state, xy chromaticity projected onto the light diffusion screen 313 has values of 0.305 for x and 0.365 for y. The xy chromaticity system is the CIEI1931 standard calorimetric system. This applies to Embodiments 2 to 4, later described.

Figure 15:
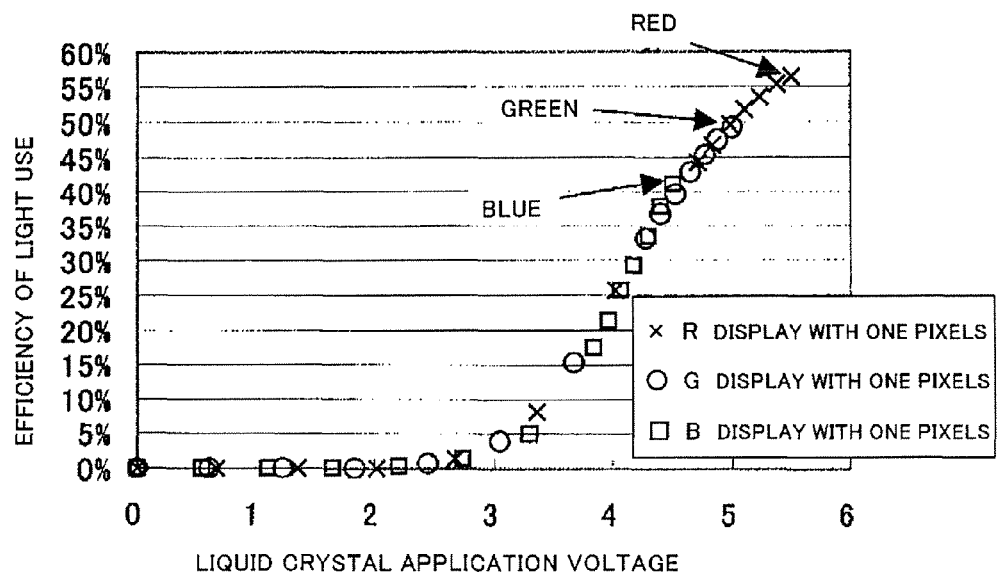
FIG. 15 is a graph showing the reflectance characteristic with a lateral electric field in the liquid crystal display element.
Figure 16:
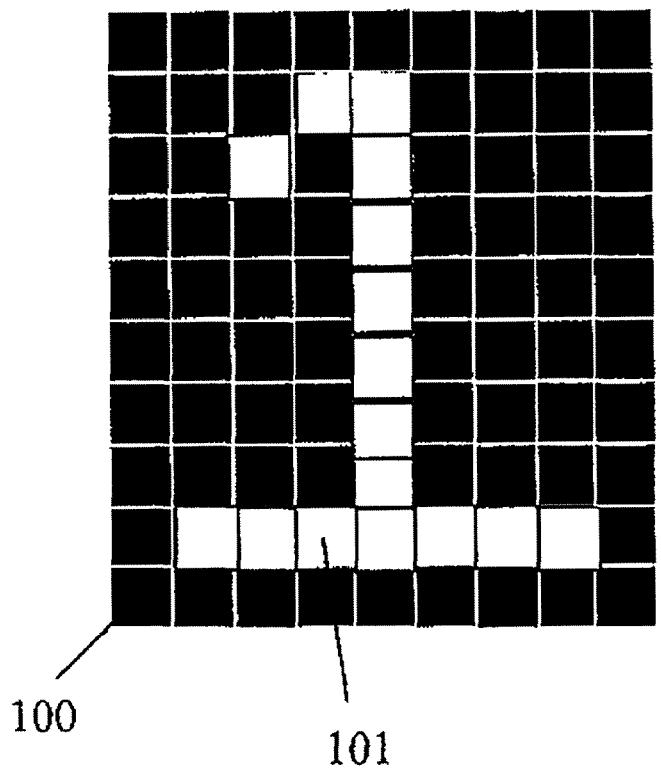
FIG. 16 shows a characteristic pattern susceptible to the lateral electric field in the liquid crystal display element.
Figure 17:
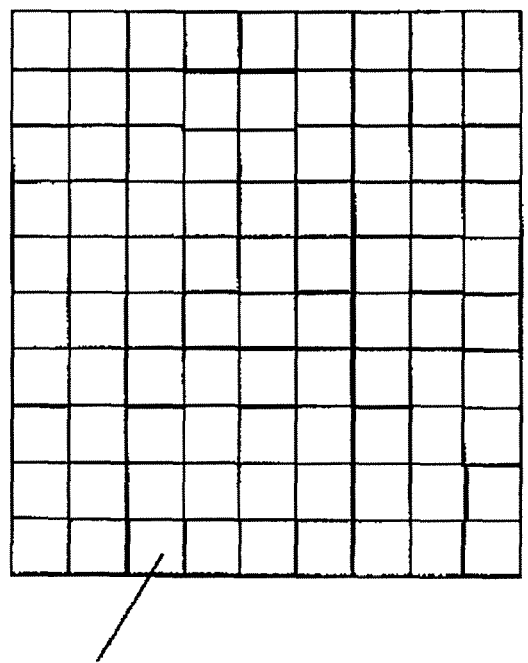
FIG. 17 shows a pattern in an all pixel white display state in the liquid crystal display element.

When a conventional VT gamma characteristic is used, a white display pixel is set to the highest reflectance voltage, while a pixel in the black display state is set to 0 V in each liquid crystal display element. Based on the reflectance rates shown in FIG. 15, the color balance in the image of the checkered pattern susceptible to the influence of a lateral electric field represents 56% for the red liquid crystal display element, 50% for the green liquid crystal display element, and 41% for the blue liquid crystal display element, which provides a more bluish and less yellowish image. As compared with the color in the all pixel white display state of x:0.305 and y:0.365, the color of the image of the checkered pattern approximately has values of x:0.310 and y:0.385, which means a shift in color.

In contrast, in Embodiment 1, the driving signal (electrode application voltage) for the blue liquid crystal display element 3B is controlled as follows. First, the electrode application voltage is controlled such that the liquid crystal application voltage in the blue liquid crystal display element 3B in the white display state is lower than the liquid crystal application voltages in the red and green liquid crystal display elements 3R and 3G in the white display state. Then, the electrode application voltage is controlled such that the liquid crystal application voltage in the blue liquid crystal display element 3B in the black display state is higher than the liquid crystal application voltages in the red and green liquid crystal display elements 3R and 3G in the black display state.

In addition, the electrode application voltage is controlled such that the liquid crystal application voltage in the blue liquid crystal display element 3B in the black display state has a value of 1% or more and 30% or less, more preferably 5% or more and 30% or less, of the liquid crystal application voltage in the blue liquid crystal display element 3B in the white display state.

Specifically, in Embodiment 1, the liquid crystal application voltage in the blue liquid crystal display element 3B in the black display state is increased to the voltage corresponding to 11.7% of the liquid crystal application voltage in the white display state. The effect of the increased liquid crystal application voltage in the black display state in this manner will be described with reference to FIG. 4.

When the highest reflectance voltage is applied to the liquid crystal layer in the white display state in the respective liquid crystal elements and no voltage is applied in the black display state to provide the lowest reflectance as in the conventional art, the reflectance curve 8 as shown in FIG. 13 is provided.

In contrast, the liquid crystal application voltage in the black display pixel 2a in the blue liquid crystal display element 3B is increased in Embodiment 1 to reduce the difference from the liquid crystal application voltage in the white display pixel 2b. This reduces the lateral electric field 9 as compared with the conventional art shown in FIG. 13. Thus, the area including the liquid crystal molecules with bad alignment is reduced, and the reflectance is generally increased as shown by 8Bk in FIG. 4.

Specifically, in Embodiment 1, the reflectance of the white display pixel 2b in the blue liquid crystal display element 3B is increased to provide the reflectance rates in displaying the checkered pattern image as the red liquid crystal display element 3R:56%, the green liquid crystal display element 3G:50%, and the blue liquid crystal display element 3B:48%. This realizes the color of the checkered pattern image with x:0.302 and y:0.366, which provides a similar color to that in the all pixel white display state having values of x:0.305 and x:0.365.

Figure 5:
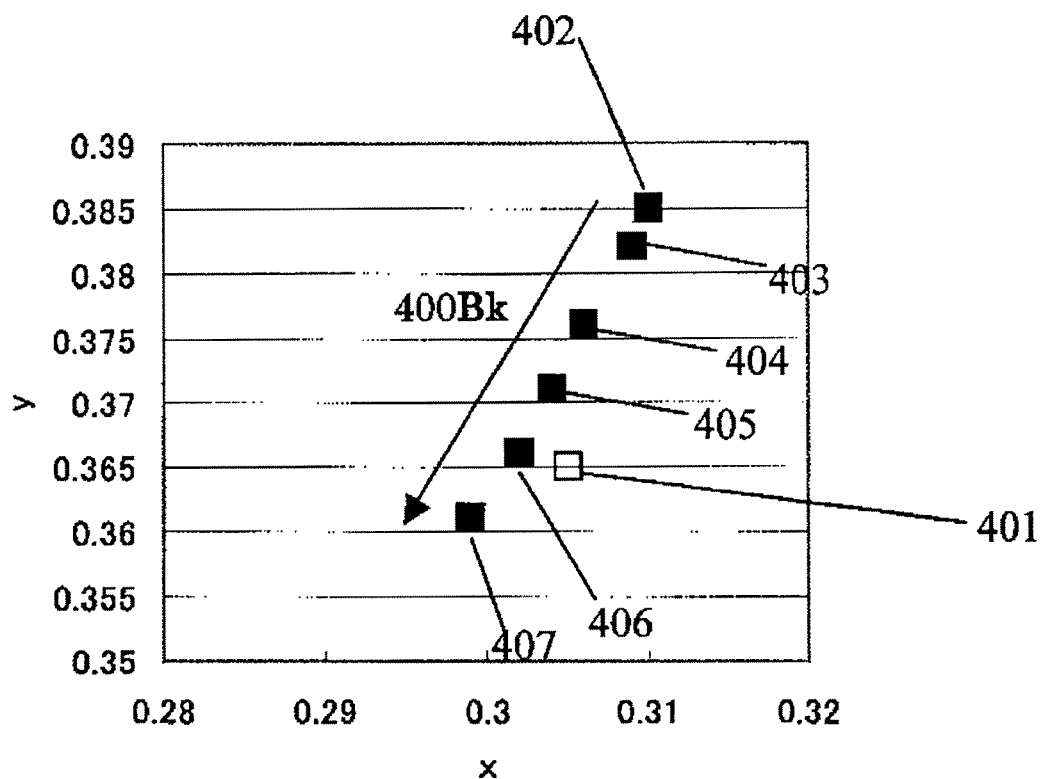
FIG. 5 is a graph showing the comparison between the color in the display of the checkered pattern and the color in an all pixel white display state in Embodiment 1.

FIG. 5 shows a change in color when the liquid crystal application voltage is changed in an image in the all pixel black display state and in black display pixels of a checkered pattern image in Embodiment 1.

In FIG. 5, reference numeral 401 shows the color of an image in the all white display state. Reference numeral 402 shows the color when the liquid crystal application voltage is set to 0 V in black display pixels of the three liquid crystal display elements 3R, 3G, and 3B, and the liquid crystal application voltage is set to the highest reflectance voltages in white display pixels.

Reference numerals 403 to 407 show the colors when the liquid crystal application voltage is changed in black display pixels of the blue liquid crystal display element 3B. The liquid crystal application voltages in the white display pixels of the three liquid crystal display elements 3R, 3G, and 3B are set to the same voltages as those in the color 402. The liquid crystal application voltages in the black display pixels of the red and green liquid crystal display elements 3R and 3G are fixed to 0 V as in the color 402.

The liquid crystal application voltage in the black display pixels of the blue liquid crystal display element 3B is set to 0.00V for the color 402, 0.13 V for the color 403, 0.26 V for the color 404, 0.40 V for the color 405, 0.53 V for the color 406, and 0.66 V for the color 407. The ratios of the liquid crystal application voltages in the black display pixels to the liquid crystal application voltage 4.5 V in the white display pixels are 0.0% for the color 402, 2.9% for the color 403, 5.8% for the color 404, 8.9% for the color 405, 11.8% for the color 406, and 14.7% for the color 407. The increased liquid crystal application voltage in the black display pixels of the blue liquid crystal display element 3B increases the reflectance in the white display pixels to add the light in the blue band in the white display image. In the setting of the liquid crystal application voltage with the color 406, the color in the image of the checkered pattern is closest to the color 401 in the image in the all pixel white display state.

In Embodiment 1 the liquid crystal application voltage in the black display pixels is increased to reduce the influence of the lateral electric field. Thus, it is necessary to take a measure against the problem of reduced contrast due to the increased luminance of the image in the all pixel black display state.

To address this, in Embodiment 1, it is desirable to control the electrode application voltage in the black display state in the respective liquid crystal display elements to satisfy the following expressions (1) and (2):

$$1/CR - 1/CR' = 1/A \quad (1)$$

$$A > 50000 \quad (2)$$

Bk represents the projection luminance when the electrode application voltages in the three liquid crystal display elements 3R, 3G, and 3B are controlled to minimize the projection luminance on the projection surface. W represents the projection luminance in the white display state in the three liquid crystal display elements 3R, 3G, and 3B. The contrast CR represents the ratio (W/Bk) between the projection luminance W and the projection luminance Bk. Bk' represents the projection luminance in the black display state in the three liquid crystal display elements 3R, 3G, and 3B. The contrast CR' represents the ratio (W/Bk') between the projection luminance W and the projection luminance Bk'.

Figure 6:
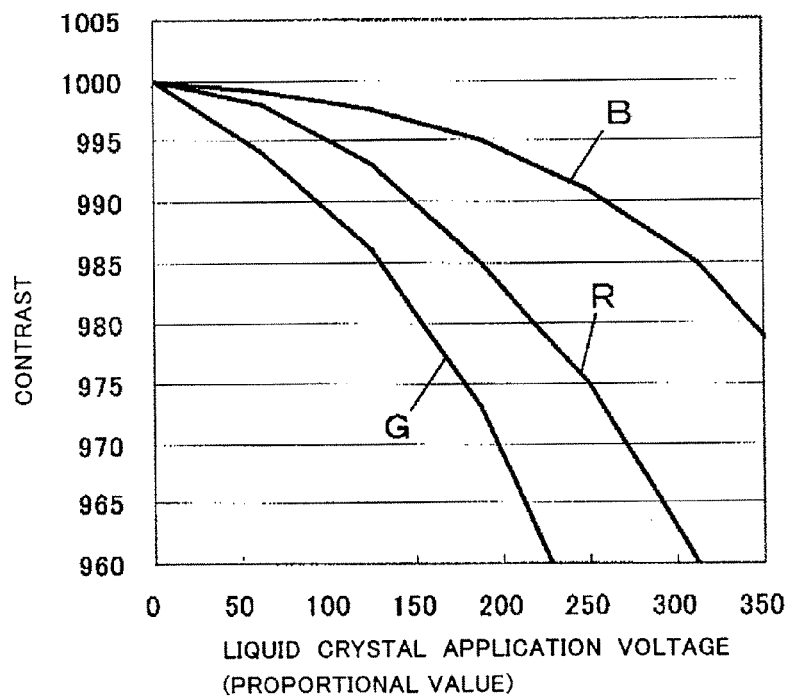
FIG. 6 is a graph showing contrast in Embodiments 1 to 3.

In a graph shown in FIG. 6, the lateral axis represents the proportional value (digital 10 bits) corresponding to the liquid crystal application value. The proportional value is provided by normalizing the voltage with the highest reflectance in the respective liquid crystal display elements by 1023 which is the maximum of 10 bits. The vertical axis represents the contrast value of the projected image.

The contrast value (CR) refers to the ratio (=W/Bk) between the projection luminance W in the all pixel white display state and the projection luminance Bk in the all pixel black display state. In FIG. 6, R, G, and B represent changes in contrast when the proportional values of the liquid crystal application voltages are changed in the black display state of the liquid crystal display elements 3R, 3G, and 3B.

In Embodiment 1, as described above, the liquid crystal application voltage in the black display pixels capable of providing the color 406 shown in FIG. 5 is the optimal setting for the color in the image of the checkered pattern. The proportion value (digital 10 bits) of the liquid crystal application value in this case is 121 (=11.8%×1024), so that the contrast CR' of the blue liquid crystal display element 3B is 999 in the curve B of FIG. 6. Thus, the reduction A (expression 2) from the contrast CR (1000) when the liquid crystal application voltage in the black display pixels is 0 V is 999000.

As described above, according to Embodiment 1, the influence of the lateral electric field produced in the liquid crystal layer can be reduced to provide the good color balance in the projected image close to the color balance in the all pixel white display state, and the image with high contrast can be projected and displayed.

Embodiment 2

Figure 7:
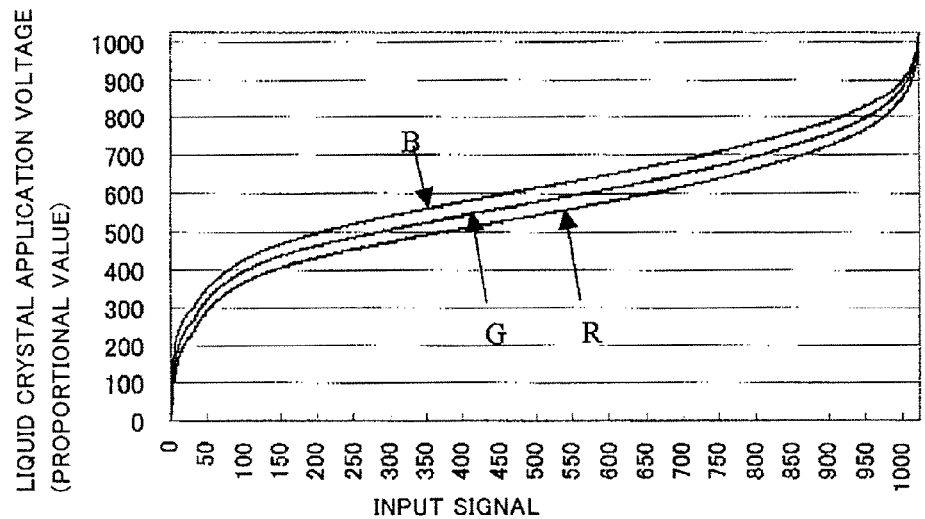
FIG. 7 is a is a graph showing a VT gamma characteristic of a liquid crystal display element used in a projector of Embodiment 2.

FIG. 7 shows a gamma characteristic in Embodiment 2 of the present invention. FIG. 7 shows the VT gamma characteristic determined such that a projected reflection output shows a curve of 2.2th power of an input video signal. In FIG. 7, the horizontal axis represents an input signal (digital 10 bits) and the vertical axis represents a proportional value (digital 10 bits) corresponding to a liquid crystal application voltage in a liquid crystal display element. The proportional value is provided by normalizing the liquid crystal application voltage with the highest reflectance in each liquid crystal display element (hereinafter referred to as the highest reflectance voltage) with 1023 which is the maximum of 10 bits.

Figure 8:
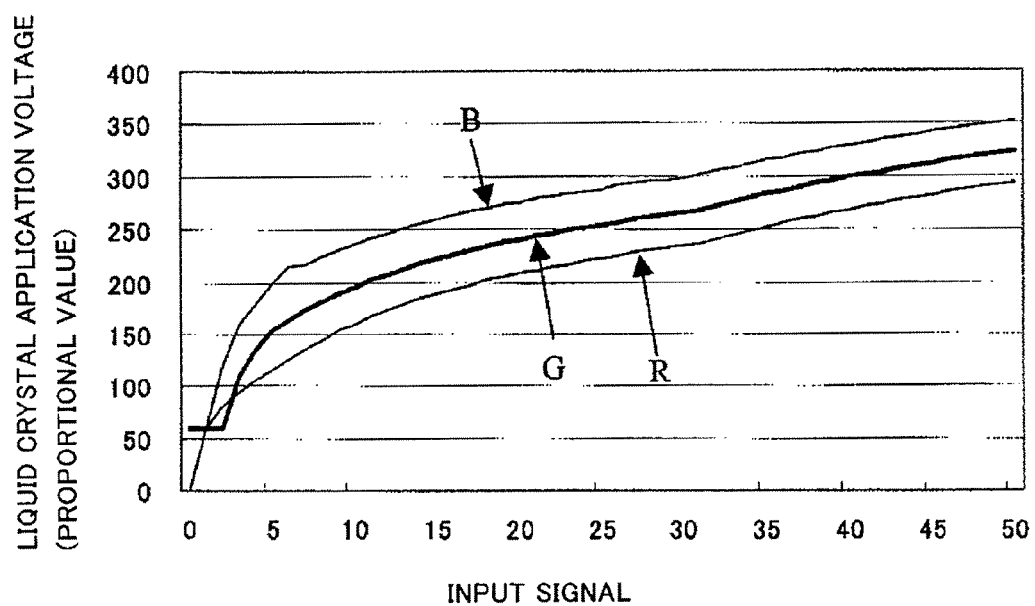
FIG. 8 is an exploded view of an area near black display in FIG. 7.

In the horizontal axis, digital value zero is a set value for liquid crystal display elements 3R, 3G, and 3B in a black display state, and the maximum digital value 1023 is a set value for the liquid crystal display elements 3R, 3G, and 3B in a white display state. FIG. 8 is an exploded view showing the area near the digital value zero in FIG. 7.

A liquid crystal projector to which Embodiment 2 is applied is identical to that described in Embodiment 1.

In Embodiment 2, the liquid crystal application voltage is set to 0 V in the red and blue liquid crystal display elements 3R and 3B in the black display state, and the liquid crystal application voltage is set to 0.29 V in the green liquid crystal display element 3G in the black display state.

The vertical axis of the VT gamma characteristic in FIGS. 7 and 8 represents the values in proportion to the liquid crystal application voltages. When the highest reflectance voltage in the green liquid crystal display element 3G is 5.0 V (FIG. 14), the liquid crystal application voltage of the green liquid crystal display element 3G in the black display state can be calculated as follows. Specifically, with reference to FIGS. 7 and 8, the digital value in the black display state on the vertical axis is 60. The ratio of that digital value to 1023 is 0.059 (=60/1023). Thus, the liquid crystal application voltage in the black display state is 0.29 V from the calculation of 0.059×5.0 V.

Now, description will be made of the color of the image of the checkered pattern shown in FIG. 18 when it is displayed in Embodiment 2.

In the projector of Embodiment 2, when all of the pixels of the liquid crystal display elements 3R, 3G, and 3B are in the white display state, the liquid crystal application voltages of the red, green, and blue liquid crystal display elements 3R, 3G, and 3B are 4.8 V, 4.3 V, and 4.5 V, respectively. In this case, xy chromaticity projected onto a light diffusion screen 313 has values of 0.29 for x and 0.34 for y.

When a conventional VT gamma characteristic is used, the liquid crystal application voltages in white display pixels of the red, green, and blue liquid crystal display elements 3R, 3G, and 3B are set to 4.8 V, 4.3 V, and 4.5 V, respectively, and the liquid crystal application voltages in black display pixels are set to 0 V. Based on the reflectance rates shown in FIG. 15, the color balance in the image of the checkered pattern susceptible to the influence of the lateral electric field represents 47% for the red liquid crystal display element, 33% for the green liquid crystal display element, and 41% for the blue liquid crystal display element, which provides a less greenish image with a tinge of magenta. As compared with the color in the all pixel white display state of x:0.29 and y:0.34, the color of the image of the checkered pattern approximately has values of x:0.295 and y:0.320, which means a shift in color.

In contrast, in Embodiment 2, the driving signal (electrode application voltage) for the green liquid crystal display element 3G is controlled as follows. First, the electrode application voltage is controlled such that the liquid crystal application voltage in the green liquid crystal display element 3G in the white display state is lower than the liquid crystal application voltages in the red and blue liquid crystal display elements 3R and 3B in the white display state. In this case, the electrode application voltage is controlled such that the liquid crystal application voltage in the green liquid crystal display element 3G in the black display state is higher than the liquid crystal application voltages in the red and blue liquid crystal display elements 3R and 3B in the black display state.

In addition, the electrode application voltage is controlled such that the liquid crystal application voltage in the green liquid crystal display element 3G in the black display state has a value of 1% or more and 30% or less, more preferably 1% or more and 15% or less, of the liquid crystal application voltage in the green liquid crystal display element 3G in the white display state.

Specifically, in Embodiment 2, the liquid crystal application voltage in the green liquid crystal display element 3G in the black display state is increased to the voltage corresponding to 5.9% of the liquid crystal application voltage in the white display state. Thus, the reflectance rates in displaying the checkered pattern image are 47% for the red liquid crystal display element 3R, 39% for the green liquid crystal display element 3G, and 41% for the blue liquid crystal display element 3B. This realizes the color of the checkered pattern image as x:0.293 and y:0.340, which provides a similar color to that in the all pixel white display state with having values of x:0.29 and x:0.34.

Figure 9:
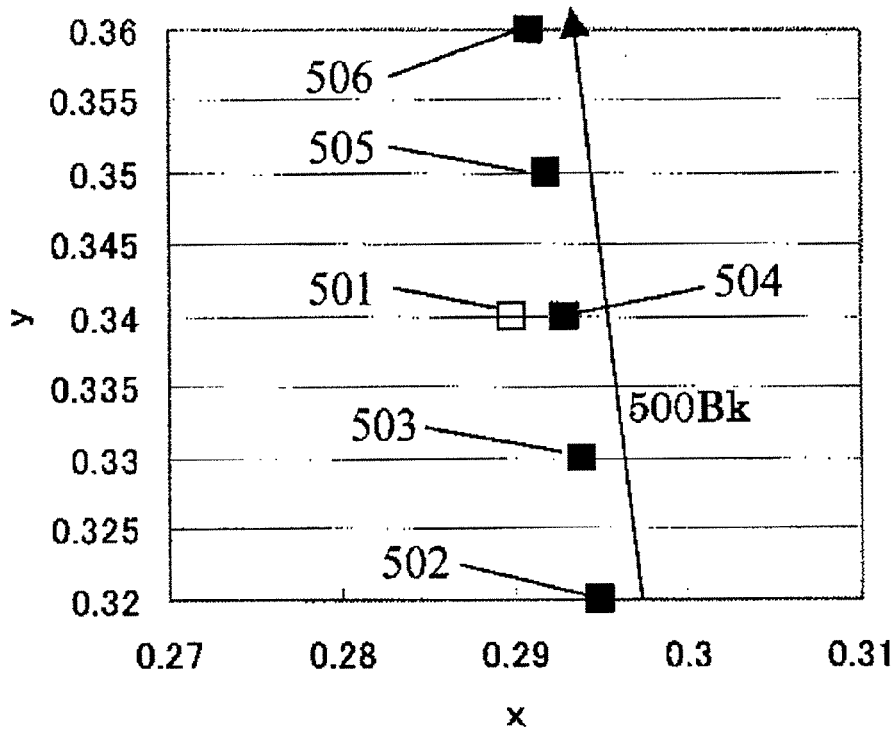
FIG. 9 is a graph showing the comparison between the color in display of a checkered pattern and the color in an all pixel white display state in Embodiment 2.

FIG. 9 shows a change in color when the liquid crystal application voltage is changed in an image in the all pixel black display state and in black display pixels of a checkered pattern image in Embodiment 2.

In FIG. 9, reference numeral 501 shows the color in the all pixel white display state. Reference numeral 502 shows the color when the liquid crystal application voltages in black display pixels of the three liquid crystal display elements 3R, 3G, and 3B are set to 0 V and when the liquid crystal application voltages in white display pixels of the three liquid crystal display elements 3R, 3G, and 3B are set to 4.8 V, 4.3 V, and 5.0 V, respectively.

Reference numerals 503 to 506 show the colors when the liquid crystal application voltage is changed in black display pixels of the green liquid crystal display element 3G. The liquid crystal application voltages in the white display pixels of the three liquid crystal display elements 3R, 3G, and 3B are set to the same voltages as those in the color 502. The liquid crystal application voltages in the black display pixels of the red and blue liquid crystal display elements 3R and 3B are fixed to 0 V as in the color 502.

The liquid crystal application voltage in the black display pixels of the green liquid crystal display element 3G is set to 0.00 V for the color 502, 0.15 V for the color 503, 0.29 V for the color 504, 0.44 V for the color 505, and 0.59 V for the color 506. The ratios of the liquid crystal application voltages in the black display pixels to the liquid crystal application voltage 5.0 V in the white display pixels are 0.0% for the color 502, 2.9% for the color 503, 5.9% for the color 504, 8.8% for the color 505, and 11.7% for the color 506. The increased liquid crystal application voltage in the black display pixels of the green liquid crystal display element 3G increases the reflectance in the white display pixels to add the light in the green band in the white display image. In the setting of the liquid crystal application voltage with the color 504, the color in the image of the checkered pattern is closest to the color 501 in the image in the all pixel white display state.

In Embodiment 2, similarly to Embodiment 1, the liquid crystal application voltage in the black display pixels is increased to reduce the influence of the lateral electric field. Thus, it is necessary to take a measure against the problem of reduced contrast due to the increased luminance of the image in the all pixel black display state.

In Embodiment 2, as described above, the liquid crystal application voltage in the black display pixels capable of providing the color 504 shown in FIG. 9 is the optimal setting for the color in the image of the checkered pattern. The proportion value (digital 10 bits) of the liquid crystal application value in this case is 60 (=5.9%×1024), so that the contrast CR' of the green liquid crystal display element 3G is 994 in the curve G of FIG. 6. Thus, the reduction A (expression 2) from the contrast CR (1000) when the liquid crystal application voltage in the black display pixels is 0 V is 165666.

As described above, according to Embodiment 2, the influence of the lateral electric field produced in the liquid crystal layer can be reduced to provide a good color balance in a projected image close to a color balance in the all pixel white display state, and an image with high contrast can be projected and displayed.

Embodiment 3

Figure 10:
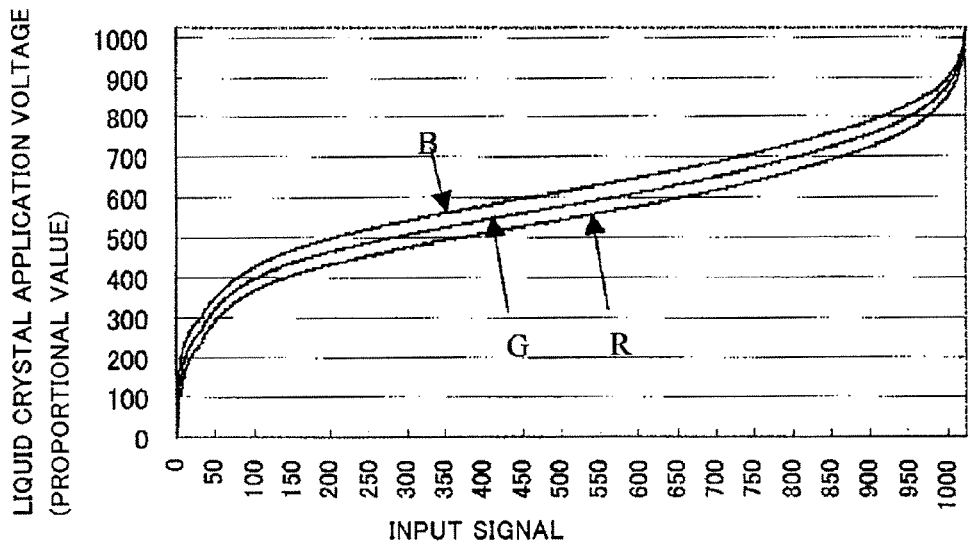
FIG. 10 is a is a graph showing a VT gamma characteristic of a liquid crystal display element used in a projector of Embodiment 3.

FIG. 10 shows a gamma characteristic in Embodiment 3 of the present invention. FIG. 10 shows the VT gamma characteristic determined such that a projected reflection output shows a curve of 2.2th power of an input video signal. In FIG. 10, the horizontal axis represents an input signal (digital 10 bits) and the vertical axis represents a proportional value (digital 10 bits) corresponding to a liquid crystal application voltage in a liquid crystal display element. The proportional value is provided by normalizing the liquid crystal application voltage with the highest reflectance in each liquid crystal display element (hereinafter referred to as the highest reflectance voltage) with 1023 which is the maximum of 10 bits.

Figure 11:
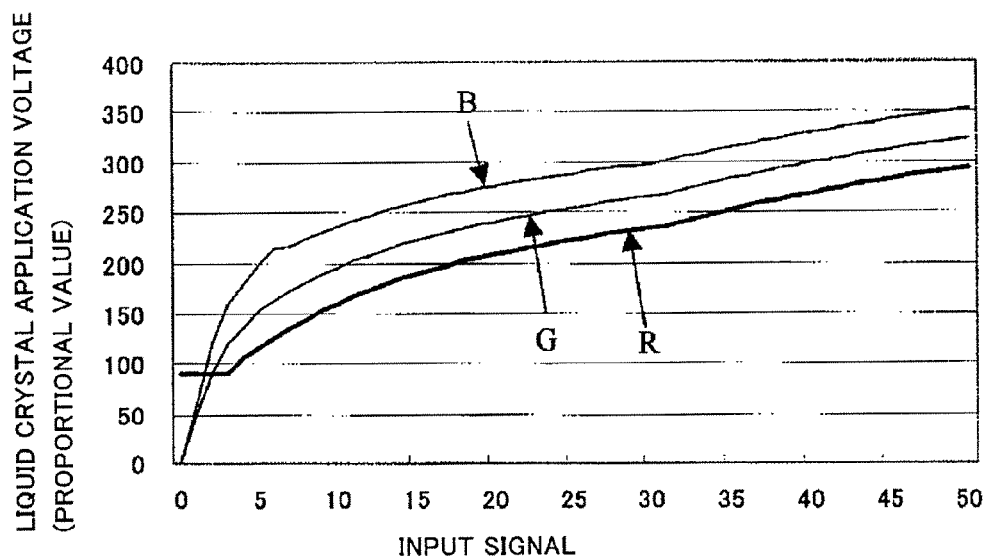
FIG. 11 is an exploded view of an area near black display in FIG. 10.

In the horizontal axis, digital value zero is a set value for liquid crystal display elements 3R, 3G, and 3B in a black display state, and the maximum digital value 1023 is a set value for the liquid crystal display elements 3R, 3G, and 3B in a white display state. FIG. 11 is an exploded view showing the area near the digital value zero in FIG. 10.

A liquid crystal projector to which Embodiment 3 is applied is identical to that described in Embodiment 1.

In Embodiment 3, the liquid crystal application voltage is set to 0 V in the green and blue liquid crystal display elements 3G and 3B in the black display state, and the liquid crystal application voltage is set to 0.48 V in the red liquid crystal display element 3R in the black display state.

The vertical axis of the VT gamma characteristic in FIGS. 10 and 11 represents the values in proportion to the liquid crystal application voltages. When the highest reflectance voltage in the red liquid crystal display element 3R is 5.5 V (FIG. 14), the liquid crystal application voltage of the red liquid crystal display element 3R in the black display state can be calculated as follows. Specifically, with reference to FIGS. 10 and 11, the digital value in the black display state on the vertical axis is 90. The ratio of that digital value to 1023 is 0.088 (=90/1023). Thus, the liquid crystal application voltage in the black display state is 0.48 V from the calculation of 0.088×5.5 V.

Now, description will be made of the color of the image of the checkered pattern shown in FIG. 18 when it is displayed in Embodiment 3.

In the projector of Embodiment 3, when all of the pixels of the liquid crystal display elements 3R, 3G, and 3B are in the white display state, the liquid crystal application voltages of the red, green, and blue liquid crystal display elements 3R, 3G, and 3B in the all pixel white display state are 4.2 V, 4.6 V, and 4.5 V, respectively. In this case, xy chromaticity projected onto a light diffusion screen 313 has values of 0.27 for x and 0.35 for y.

When a conventional VT gamma characteristic is used, the liquid crystal application voltages in white display pixels of the red, green, and blue liquid crystal display elements 3R, 3G, and 3B are set to 4.2 V, 4.6 V, and 4.5 V, respectively, and the liquid crystal application voltages in black display pixels are set to 0 V. Based on the reflectance rates shown in FIG. 15, the color balance in the image of the checkered pattern susceptible to the influence of a lateral electric field represents 31% for the red liquid crystal display element, 43% for the green liquid crystal display element, and 41% for the blue liquid crystal display element, which provides a less reddish image with a tinge of cyan. As compared with the color in the all pixel white display state of x:0.27 and y:0.35, the color of the image of the checkered pattern approximately has values of x:0.25 and y:0.35, which means a shift in color.

In contrast, in Embodiment 3, the driving signal (electrode application voltage) for the red liquid crystal display element 3R is controlled as follows. First, the electrode application voltage is controlled such that the liquid crystal application voltage in the red liquid crystal display element 3R in the white display state is lower than the liquid crystal application voltages in the green and blue liquid crystal display elements 3G and 3B in the white display state. In this case, the electrode application voltage is controlled such that the liquid crystal application voltage in the red liquid crystal display element 3R in the black display state is higher than the liquid crystal application voltages in the green and blue liquid crystal display elements 3G and 3B in the black display state.

In addition, the electrode application voltage is controlled such that the liquid crystal application voltage in the red liquid crystal display element 3R in the black display state has a value of 1% or more and 30% or less, more preferably 3% or more and 20% or less, of the liquid crystal application voltage in the red liquid crystal display element 3R in the white display state.

Specifically, in Embodiment 3, the liquid crystal application voltage in the red liquid crystal display element 3R in the black display state is increased to the voltage corresponding to 8.8% of the liquid crystal application voltage in the white display state. Thus, the reflectance rates in displaying the checkered pattern image are 39% for the red liquid crystal display element 3R, 43% for the green liquid crystal display element 3G, and 41% for the blue liquid crystal display element 3B. This realizes the color of the checkered pattern as x:0.269 and y:0.350, which provides a similar color to that in the all pixel white display state having values of x:0.27 and x:0.35.

Figure 12:
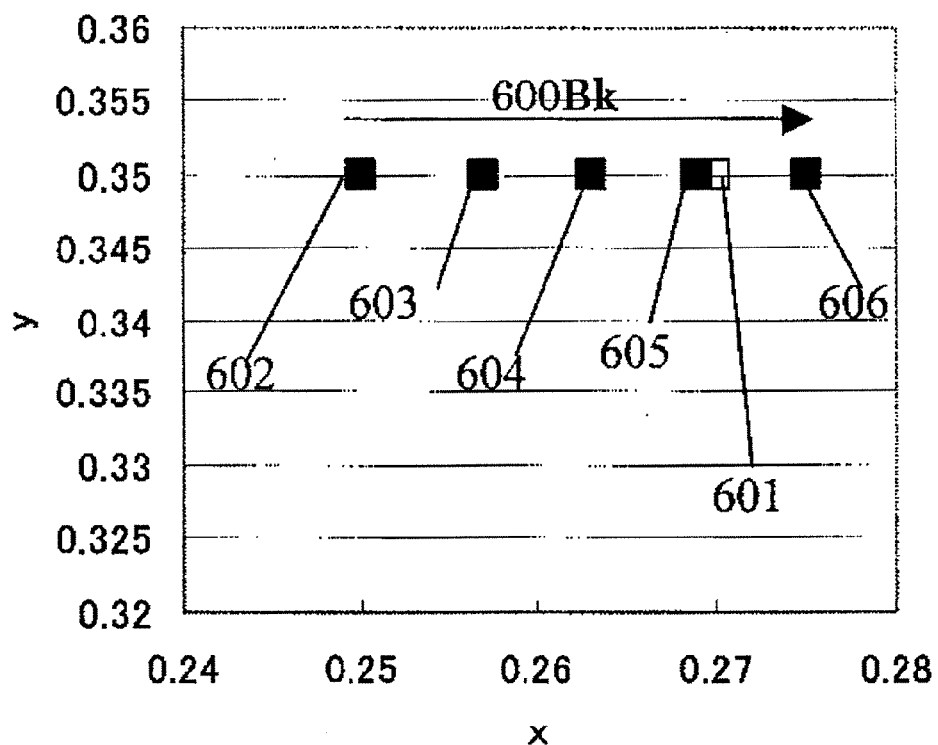
FIG. 12 is a graph showing the comparison between the color in display of a checkered pattern and the color in an all pixel white display state in Embodiment 3.

FIG. 12 shows a change in color when the liquid crystal application voltage is changed in an image in the all pixel black display state and in black display pixels of a checkered pattern image in Embodiment 3.

In FIG. 12, reference numeral 601 shows the color in the all pixel white display state. Reference numeral 602 shows the color when the liquid crystal application voltages in black display pixels of the three liquid crystal display elements 3R, 3G, and 3B are set to 0 V and when the liquid crystal application voltages in white display pixels of the three liquid crystal display elements 3R, 3G, and 3B are set to 4.2 V, 4.6 V, and 4.5 V, respectively.

Reference numerals 603 to 606 show the color when the liquid crystal application voltage is changed in black display pixels of the red liquid crystal display element 3R. The liquid crystal application voltages in the white display pixels of the three liquid crystal display elements 3R, 3G, and 3B are set to the same voltages as those in the color 602. The liquid crystal application voltages in the black display pixels of the green and blue liquid crystal display elements 3G and 3B are fixed to 0 V as in the color 602.

The liquid crystal application voltage in the black display pixels of the red liquid crystal display element 3R is set to 0.00 V for the color 602, 0.16 V for the color 603, 0.32 V for the color 604, 0.48 V for the color 605, and 0.65 V for the color 606. The ratios of the liquid crystal application voltages in the black display pixels to the liquid crystal application voltage 5.5 V in the white display pixels are 0.0% for the color 602, 2.9% for the color 603, 5.9% for the color 604, 8.8% for the color 605, and 11.7% for the color 606. The increased liquid crystal application voltage in the black display pixels of the red liquid crystal display element 3R increases the reflectance in the white display pixels to add the light in the red band in the white display image. In the setting of the liquid crystal application voltage with the color 605, the color in the image of the checkered pattern is closest to the color 601 in the image in the all pixel white display state.

In Embodiment 3, similarly to Embodiment 1, the liquid crystal application voltage in the black display pixels is increased to reduce the influence of the lateral electric field. Thus, it is necessary to take a measure against the problem of reduced contrast due to the increased luminance of the image in the all pixel black display state.

In Embodiment 3, as described above, the liquid crystal application voltage in the black display pixels capable of providing the color 605 shown in FIG. 12 is the optimal setting for the color in the image of the checkered pattern. The proportion value (digital 10 bits) of the liquid crystal application value in this case is 90 (=8.8%×1024), so that the contrast CR' of the red liquid crystal display element 3R is 996 in the curve R of FIG. 6. Thus, the reduction A (expression 2) from the contrast CR (1000) when the liquid crystal application voltage in the black display pixels is 0 V is 249000.

As described above, according to Embodiment 3, the influence of the lateral electric field produced in the liquid crystal layer can be reduced to provide a good color balance in a projected image close to a color balance in the all pixel white display state, and an image with high contrast can be projected and displayed.

Embodiment 4

As Embodiment 4 of the present invention, description will be made of a projector using liquid crystal display elements of the normally white type in which retardation is reduced to provide a projected image in the black display state as the liquid crystal application voltage is increased.

The "normally white" in use in the projector means the following characteristic. Specifically, in the relationship between the liquid crystal display elements and polarization beam splitters and polarizing plates for analyzing image light emerging from the liquid crystal display elements, it refers to the characteristic that an increased voltage applied to the liquid crystal display element leads to a lower luminance of the image light analyzed by the polarization beam splitters or the like.

In other words, it means the characteristic that white display (the brightest display) is performed when a voltage applied to the liquid crystal display element is equal to or close to zero, and black display is performed, that is, the luminance of the image light analyzed by the polarization beam splitters and the like is reduced when a higher voltage is applied to the liquid crystal display element.

In using a normally white liquid crystal display element, the liquid crystal application voltage has conventionally been set as follows. Specifically, in a white display state (a state in which substantially no voltage is applied to provide retardation), the liquid crystal application voltage in a blue liquid crystal display element is set to be higher than the liquid crystal application voltages in green and red liquid crystal display elements. In a black display state (a state in which substantially the highest voltage is applied to provide no retardation), the liquid crystal application voltage in the blue liquid crystal display element is set to substantially the same value as the liquid crystal application voltages in the green and red liquid crystal display elements. This results in the problem that the green and red liquid crystal display elements are more susceptible to the lateral electric field than the blue liquid crystal display element, the problem which produces white display with a tinge of blue.

To address this, in Embodiment 4, the liquid crystal application voltage in the blue liquid crystal display element in the black display state is set to be higher than the liquid crystal application voltages in the green and red liquid crystal display elements in the black display state. This causes the blue liquid crystal display element to be susceptible to a lateral electric field to provide good balance in all of the colors of blue, green, and red, thereby preventing coloring in the white display state.

In Embodiment 4, in view of the wavelength dispersion characteristic of the liquid crystal molecules in the white display state, the liquid crystal application voltages to provide the highest reflectance in the respective liquid crystal display elements need to have the highest value for the blue liquid crystal display element, followed by the green liquid crystal display element and the red liquid crystal display element. This is the reverse order to that in the normally black liquid crystal display elements described in Embodiments 1 to 3. Thus, the effect of the liquid crystal application voltage in the black display state is also reversed. Specifically, when the normally white liquid crystal display elements are used, the liquid crystal application voltage in the black display state is set at a high value similarly to Embodiments 1 to 3 in the liquid crystal display element to which the high liquid crystal application voltage is applied in the white display state.

As a first example, description will be made of the case where an electrode application voltage in the blue liquid crystal display element is controlled such that the liquid crystal application voltage of the blue liquid crystal display element in the white display state is higher than the liquid crystal application voltages of the red and green liquid crystal display elements in the white display state.

In this case, the electrode application voltage is controlled such that the liquid crystal application voltage of the blue liquid crystal display element in the black display state is higher than the liquid crystal application voltages of the red and green liquid crystal display elements in the black display state.

As a second example, description will be made of the case where an electrode application voltage in the green liquid crystal display element is controlled such that the liquid crystal application voltage of the green liquid crystal display element in the white display state is higher than the liquid crystal application voltages of the red and blue liquid crystal display elements in the white display state.

In this case, the electrode application voltage is controlled such that the liquid crystal application voltage of the green liquid crystal display element in the black display state is higher than the liquid crystal application voltages of the red and blue liquid crystal display elements in the black display state.

As a third example, description will be made of the case where an electrode application voltage in the red liquid crystal display element is controlled such that the liquid crystal application voltage of the red liquid crystal display element in the white display state is higher than the liquid crystal application voltages of the green and blue liquid crystal display elements in the white display state.

In this case, the electrode application voltage is controlled such that the liquid crystal application voltage of the red liquid crystal display element in the black display state is higher than the liquid crystal application voltages of the green and blue liquid crystal display elements in the black display state.

It is desirable that the electrode application voltage of each liquid crystal display element in the black display state is controlled to satisfy the expressions (1) and (2) described in Embodiment 1 in any of the first to third examples.

As a result, the influence of the lateral electric field produced in the liquid crystal layer can be reduced to provide a good color balance in a projected image close to a color balance in the all pixel white display state, and an image with high contrast can be projected and displayed.

As described above, according to Embodiments 1 to 4, the liquid crystal application voltage in the black display state is offset most within the limited range of offset in one of the three liquid crystal display elements that has the lowest liquid crystal application voltage in the white display state. This can provide a good color in an image of a checkered pattern or an image including one white display pixel (or one white display pixel line) on a black background.

In other words, according to Embodiments 1 to 4, the poor color balance due to the influence of the lateral electric field can be reduced in the liquid crystal display elements to project an image having a good color. Especially, the use of light efficiency can be increased in a white display pixel adjacent to a black display pixel to achieve the color balance of the white display pixels closer to the color balance in the all pixel white display state.

Furthermore, the present invention is not limited to these preferred embodiments and various variations and modifications may be made without departing from the scope of the present invention.

This application claims foreign priority benefits based on Japanese Patent Application No. 2006-126572, filed on Apr. 28, 2006, which is hereby incorporated by reference herein in its entirety as if fully set forth herein.

What is claimed is:

1. An image projection apparatus, comprising:
a first liquid crystal display element which light in a first color band enters, a second liquid crystal display element which light in a second color band enters, and a third liquid crystal display element which light in a third color band enters, the image projection apparatus combining the light in the color bands from the first, second, and third liquid crystal display elements and projecting the combined light onto a projection surface; and
a controller which controls a voltage applied to electrodes in each of the first, second, and third liquid crystal display elements,
wherein each of the liquid crystal display
elements includes a liquid crystal layer, and first and second opposite electrodes for applying a voltage to the liquid crystal layer through alignment films, and as the voltage applied to the liquid crystal layer is increased, retardation provided for the light in each of the color bands is increased,
when the voltage which is applied to the liquid crystal layer is referred to as a liquid crystal application voltage and the voltage which is applied to the first and second opposite electrodes is referred to as an electrode application voltage,
the controller controls the electrode application voltage in the first liquid crystal display element such that the liquid crystal application voltage in the first liquid crystal display element in a white display state is lower than the liquid crystal application voltages in the second and third liquid crystal display elements in the white display state, and such that the liquid crystal application voltage in the first liquid crystal display element in a black display state is higher than the liquid crystal application voltages in the second and third liquid crystal display elements in the black display state and has a value of 1% or more and 30% or less of the liquid crystal application voltage in the first liquid crystal display element in the white display state.

2. The image projection apparatus according to claim 1, wherein the image projection apparatus combines light from a red liquid crystal display element which light in a red band enters, light from a green liquid crystal display element which light in a green band enters, and light from a blue liquid crystal display element which light in a blue band enters, and projects the combined light onto the projection surface,
the controller controls an electrode application voltage in the blue liquid crystal display element such that a liquid crystal application voltage in the blue liquid crystal display element in the white display state is lower than liquid crystal application voltage in the red and green liquid crystal display elements in the white display state, and such that the liquid crystal application voltage in the blue liquid crystal display element in the black display state is higher than the liquid crystal application voltages in the red and green liquid crystal display elements in the black display state and has a value of 5% or more and 30% or less of the liquid crystal application voltage in the blue liquid crystal display element in the white display state.

3. The image projection apparatus according to claim 1, wherein the image projection apparatus combines light from a red liquid crystal display element which light in a red band enters, light from a green liquid crystal display element which light in a green band enters, and light from a blue liquid crystal display element which light in a blue band enters, and projects the combined light onto the projection surface,
the controller controls an electrode application voltage in the green liquid crystal display element such that a liquid crystal application voltage in the green liquid crystal display element in the white display state is lower than liquid crystal application voltage in the red and blue liquid crystal display elements in the white display state, and such that the liquid crystal application voltage in the green liquid crystal display element in the black display state is higher than the liquid crystal application voltages in the red and blue liquid crystal display elements in the black display state and has a value of 1% or more and 15% or less of the liquid crystal application voltage in the green liquid crystal display element in the white display state.

4. The image projection apparatus according to claim 1, wherein the image projection apparatus combines light from a red liquid crystal display element which light in a red band enters, light from a green liquid crystal display element which light in a green band enters, and light from a blue liquid crystal display element which light in a blue band enters, and projects the combined light onto the projection surface,
the controller controls an electrode application voltage in the red liquid crystal display element such that a liquid crystal application voltage in the red liquid crystal display element in the white display state is lower than liquid crystal application voltage in the green and blue liquid crystal display elements in the white display state, and such that the liquid crystal application voltage in the red liquid crystal display element in the black display state is higher than the liquid crystal application voltages in the green and blue liquid crystal display elements in the black display state and has a value of 3% or more and 20% or less of the liquid crystal application voltage in the red liquid crystal display element in the white display state.

5. The image projection apparatus according to claim 1, wherein the controller controls the electrode application voltage in each of the liquid crystal display elements in the black display state to satisfy the following conditions:

$$1/CR - 1/CR' = 1/A$$

$$A > 50000$$

where Bk represents a projection luminance when the electrode application voltages in the
three liquid crystal display elements are controlled to minimize the projection luminance on the projection surface, W represents a projection luminance when the three liquid crystal display elements are in the white display state, a contrast CR represents the ratio W/Bk between the projection luminance W and the projection luminance Bk, Bk' represents a projection luminance when the three liquid crystal display elements are in the black display state, and a contrast CR' represents the ratio W/Bk' between the projection luminance W and the projection luminance Bk'.

6. An image projection apparatus comprising:
a first liquid crystal display element which light in a first color band enters, a second liquid crystal display element which light in a second color band enters, and a third liquid crystal display element which light in a third color band enters, the image projection apparatus combining the light in the color bands from the first, second, and third liquid crystal display elements and projecting the combined light onto a projection surface; and
a controller which controls a voltage applied to electrodes in each of the first, second, and third liquid crystal display elements,
wherein each of the liquid crystal display elements includes a liquid crystal layer, and first and second opposite electrodes for applying a voltage to the liquid crystal layer through alignment films, and as the voltage applied to the liquid crystal layer is increased, retardation provided for the light in each of the color bands is reduced,
when the voltage which is applied to the liquid crystal layer is referred to as a liquid crystal application voltage and the voltage which is applied to the first and second opposite electrodes is referred to as an electrode application voltage,
the controller controls the electrode application voltage in the first liquid crystal display element such that the liquid crystal application voltage in the first liquid crystal display element in a white display state is higher than the liquid crystal application voltages in the second and third liquid crystal display elements in the white display state, and such that the liquid crystal application voltage in the first liquid crystal display element in a black display state is higher than the liquid crystal application voltages in the second and third liquid crystal display elements in the black display state.

7. An image display system comprising:
the image projection apparatus according to claim 1; and
an image supply apparatus which supplies image information to the image projection apparatus.

8. An image display system comprising:
the image projection apparatus according to claim 6; and
an image supply apparatus which supplies image information to the image projection apparatus.

* * * * *